United States Patent [19]

Schumann

[11] Patent Number: 5,859,173

[45] Date of Patent: Jan. 12, 1999

[54] PROCESS FOR THE PRODUCTION OF FLAME-RESISTANT POLYESTERS

[75] Inventor: Heinz-Dieter Schumann, Maintal, Germany

[73] Assignee: Lurgi Zimmer Aktiengesellschaft, Germany

[21] Appl. No.: 968,607

[22] Filed: Nov. 13, 1997

[30] Foreign Application Priority Data

Sep. 11, 1997 [DE] Germany ............ 197 39 852.9

[51] Int. Cl.$^6$ .................................................. C08G 63/00
[52] U.S. Cl. ............................................ 528/271; 528/272
[58] Field of Search ........................... 28/176, 271, 272

[56] References Cited

U.S. PATENT DOCUMENTS

| | | | |
|---|---|---|---|
| 3,024,220 | 3/1962 | Cramer et al. | 528/176 |
| 3,050,548 | 8/1962 | Munro et al. | 528/176 |
| 3,900,444 | 8/1975 | Racky et al. | 528/167 |
| 3,941,752 | 3/1976 | Kleiner et al. | 528/176 |
| 4,033,936 | 7/1977 | Bollert et al. | 528/287 |
| 4,081,463 | 3/1978 | Birum et al. | 528/167 |
| 5,550,207 | 8/1996 | Neri et al. | 528/287 |

FOREIGN PATENT DOCUMENTS

| | | |
|---|---|---|
| 1232348 | 11/1959 | Germany . |
| 1520976 | 7/1961 | Germany . |
| 2017072 | 4/1970 | Germany . |

*Primary Examiner*—Terressa Mosley
*Attorney, Agent, or Firm*—McDonnell Boehnen Hulbert & Berghoff

[57] ABSTRACT

The present invention comprises a process for the production of flame-resistant polyesters with at least 50 mol-% ethylene carboxylate units through esterification or ester interchange and co-polycondensation of at least one diol and a dicarboxylic acid or its dialkyl ester with a carboxyphosphinic acid, whereby the carboxyphosphinic acid, before being added to the co-polycondensation mixture, is dissolved in ethylene glycol of not more than 90° C., and the acid number of this solution is standardized to 50 to 350 mg KOH/g of carboxyphosphinic acid by adding at least one basic alkali metal compound in the absence of oxygen, and said solution is added to the co-polycondensation mixture during the second half of the esterification or ester interchange reaction.

6 Claims, No Drawings

PROCESS FOR THE PRODUCTION OF FLAME-RESISTANT POLYESTERS

BACKGROUND

1. Field of the Invention

The present invention relates to a process for the production of flame-resistant polyesters with at least 50 mol-% ethylene carboxylate units through co-polycondensation with at least one carboxyphosphinic acid.

2. Summary of the Related Art

Flame-resistant polyesters, especially for textile applications such as washable curtains or decorative materials, are preferably manufactured today by co-polycondensation with bi-functional phosphorus containing compounds. Carboxyphosphinic acids or their cyclic anhydrides, the phospholanes (U.S. Pat. No. 3,941,752), are suited for that purpose. The disadvantage of the production of phospholanes is that it is relatively complex. The synthesis of carboxyphosphinic acids, for example of carboxyethyl (phenyl)phosphinic acid (IUPAC name 3-(phenyl (hydroxyphosphoryl))propanoic acid) (U.S. Pat. No. 4,081, 463), is less complicated.

However, the carboxyphosphinic acids are bi-functional acids with a strong acidic nature (pH<1.5). A result of this, in the case of its application as a co-monomer, the polyester produced therefrom has a higher content of diethylene glycol (DEG) with all of the accompanying disadvantages (e.g., stickiness of the granulate during drying and/or thermal pre-treatment before spinning, as well as a lowered melting temperature of the polyester to a point where it causes difficulties during ironing). During matting of the polyester with titanium dioxide, there is the risk that the titanium dioxide suspension will be rendered unstable by the acidic protons and that agglomerates will precipitate, leading to shorter filter clogging times and to difficulties during the spinning process. The acidic nature of the carboxyphosphinic acid has an especially negative effect on the batch production of polyester by direct esterification of dicarboxylic acids with ethylene glycol, because of the substantial amount of the esterification product of the previous batch remaining in the reactor, which causes the DEG content to rise from batch to batch.

It is also known that flame-resistant polyesters can be produced by co-polymerization with alkali salts of phosphinic acids (U.S. Pat. No. 3,900,444). Because of their mono-functional nature, however, such salts act as chain breaking agents and promote corrosion of the processing machinery. Others have used an alkali salt of a diolester of a bis-(carboxy)phosphinic acid as a co-monomer (DE Patent Specification 12 32 348). This co-monomer is produced by boiling bis-(carboxy)phosphinic acid and sodium chloride with an abundance of ethylene glycol for several hours. When sodium chloride is replaced with sodium carbonate, no salt is obtained. As a result of the then tri-functional nature of the bis-(carboxy)ester of the phosphinic acid, only heavily cross-linked, gel-like, unspinnable polyesters are produced.

It is further known that the formation of DEG during direct esterification of terephthalic acid with ethylene glycol and the subsequent polycondensation in the absence of carboxyphosphinic acid can be reduced by adding sodium or potassium hydroxide (U.S. Pat. No. 3,050,548), sodium oxide (DE-A 20 17 072), lithium or postassium hydroxide, lithium carbonate or sodium acetate (DE-A 1 520 976), or sodium or calcium acetate (U.S. Pat. No. 3,024,220) to the esterification reaction.

There are no suggestions with regard to the application and/or procedure during the co-polycondensation with carboxyphosphinic acids. In particular, there is no information regarding how the strongly acidic groups of the carboxyphosphinic acid, responsible for the higher DEG formation, can be neutralized without impairing their reactivity with regard to polyester formation. Consequently, new methods of producing flame-resistant polyesters are desired.

SUMMARY OF THE INVENTION

The object of the invention is to modify the process described above in such a way that on the one hand the bi-functional reactive ability of the carboxyphosphinic acid is not impaired, and on the other hand the negative effects of the high acidity of said acid, especially the higher DEG formation during the polyester synthesis, can be avoided or minimized.

The invention accomplishes this task in the case of a process of the production for flame-resistant polyesters through esterification or ester interchange and co-polycondensation of at least one diol and at least one dicarboxylic acid or its dialkyl ester with at least one carboxyphosphinic acid with the formula HOOC—R—P(O)(OH)R', whereby R and R' are independently $C_{1-10}$-alkyl or $C_{6-10}$-aryl. Before being added to the co-polycondensation mixture, the carboxyphosphinic acid is dissolved in ethylene glycol of not more than 90° C., and the acid number of this solution is standardized to 50 to 350 mg KOH/g of carboxyphosphinic acid by adding at least one basic alkali metal compound in the absence of oxygen.

Though foregoing merely summarizes certain aspects of the present invention and is not intended, nor should it be construed, as limiting the convention in any manner. All patents and other obligations cited herein are hereby incorporated by reference in their entirety to the extent consistent with the present invention.

DETAILED DESCRIPTION OF THE PREFERRED EMBODIMENTS

The present invention comprises a process of the production for flame-resistant polyesters through esterification or ester interchange and co-polycondensation of at least one diol and a dicarboxylic acid or its dialkyl ester with at least one carboxyphosphinic acid with the formula HOOC—R—P(O)(OH)R', whereby R and R' are independently $C_{1-10}$-alkyl or $C_{6-10}$-aryl, and whereby the carboxyphosphinic acid, before being added to the co-polycondensation mixture, is dissolved in ethylene glycol of not more than 90° C., and the acid number of this solution is standardized to 50 to 350 mg KOH/g of carboxyphosphinic acid by adding at least one basic alkali metal compound in the absence of oxygen, and said solution is added to the co-polycondensation mixture during the second half of the esterification or ester interchange reaction.

The polyester can be produced continuously or discontinuously by direct esterification or ester interchange and subsequent polycondensation in the melting phase and, if desired, in the solid phase. The polyester-forming diol consists of at least 50 mol-% ethylene glycol (relative to diol), and optionally a complementary amount of 1,3-propanediol, 1,4-butane diol, 1,4-cyclohexane dimethanol, and, in smaller amounts, the respective polyalkylene glycols or mixtures thereof. The dicarboxylic acid consists of terephthalic acid or 2,6-naphthalene dicarboxylic acid or mixtures thereof, as well as mixtures of one of these acids with smaller amounts of isophtalic acid, 4,4'-biphenyl dicarboxylic acid, and 1,4-cyclohexane dicarboxylic acid, or mixtures thereof. Alternatively, lower alkyl esters can be employed, particularly dimethyl esters. Polyethylene terephtalate (PET) is the preferred polyester. The polyester can be synthesized in the customary manner in the presence of customary catalysts and, if necessary, of customary stabilizers, branching agents, matting agents, dye and/or other known additives.

Any carboxy(dialkyl)phosphinic acid, carboxy(alkylaryl)phosphinic acid or carboxy(diaryl)phosphinic acid of the formula HOOC—R—P(O)(OH)R' can be used. Preferably, R is methylene, ethylene, or propylene and R' is methyl, ethyl or phenyl. Carboxyethyl(phenyl)phosphinic acid is especially preferred. The amount of carboxyphosphinic acid depends on the desired features of the polyester and customarily is in the range of 1 to 10 weight-%, preferably at 2 to 5 weight-%, relative to the polyester.

According to the invention, the carboxyphosphinic acid (which usually is available in powder form) is dissolved in ethylene glycol at a maximum temperature of 90° C., preferably at 70° to 90° C., while stirring. The solution should be fairly concentrated, e.g., 30 to 60 weight-%. The process of dissolving may require several hours. The temperature during dissolution should not exceed 90° C. because of the risk of an increased DEG formation. Subsequently, the solution is cooled to below 50° C., preferably to 30°–40° C., and evacuated to remove the oxygen, whereby the negative pressure is interrupted at least two times with oxygen free nitrogen (having at most 300 ppm $O_2$). At this time, while stirring and maintaining the nitrogen atmosphere, a basic alkali metal compound is added slowly, until the acid number of the solution determined by titration is standardized to a value in the range of 50 to 350 mg KOH, preferably 100 to 250 mg KOH, and especially preferably 100 to 200 mg KOH per g of carboxyphosphinic acid. The acid number is determined by potentiometric titration with 0.1M ethanolic potash lye of a mixture of about 120 mg carboxyphosphinic acid solution in 30 ml water. Depending on the size of the batch, a homogenous distribution of the alkali metal compound in the carboxyphosphinic acid solution occurs after 15 to 20 minutes, maximally after 30 minutes. At that time a sample is taken in order to determine the acid number. If necessary, the required amount of the alkali metal compound can be determined in a preliminary test.

The alkali metal compound may be added only until the stated acidity is reached, since the ability for co-polycondensation is impaired as the pH approaches neutrality. The mono alkali metal salt of the carboxyphosphinic acid acts as a chain breaking agent, which in this case is undesired. Surprisingly, even small amounts of basic alkali metal compound are sufficient to restrain the formation of DEG during the storage of the solution and during the polyester synthesis. What enables the undyed polyester to be colorless is the absence of oxygen during the addition of the alkali metal compound and, if necessary, afterwards during the storage of the standardized carboxyphosphinic acid solution. To minimize the damage caused by the remaining traces of oxygen, if any, the temperature is adjusted to below 50° C. during the addition of the alkali metal compound.

Sodium acetate, sodium carbonate, sodium hydroxide, or their respective potassium compounds are especially suited as alkali metal compounds. One or more of these alkali metal compounds can be used. Especially preferred are sodium hydroxide and potassium hydroxide, a small amount of which is sufficient to obtain an acid number of 100 to 200 mg KOH/g. The carbonates and especially the acetates are not as effective and, if applied in small quantities, allow only acid numbers of 250 to 350 mg KOH/g to be obtained.

The carboxyphosphinic acid solution with the acid number according to the invention is added to the polycondensation mixture during the second half, and preferably near the end, of the esterification or ester interchange reaction. The addition must, on the one hand, be accomplished early enough in order to allow for a flawless co-polycondensation in the statistical distribution, and on the other hand as late as possible in order to allow for the DEG formation to be minimized. The best possible moment for the addition is when approximately 80% to 90% of the carboxyl groups of the dicarboxylic acid(s) are esterified with diol. In the case of direct esterification of dicarboxylic acid, the esterification rate (U) can be calculated from the saponification number $(V_z)$ and the acid number $(S_z)$ of the reaction mixture according to the formula $U=[(V_z-S_z)\times 100]/V_z$. The saponification number is determined by saponification with potassium hydroxide in n-propanol and potentiometric titration in dimethyl formamide. The ester interchange of dicarboxylic acid dialkyl esters is controlled by the temperature of the reaction product. Thus, during the ester interchange of dimethyl terephthalate with ethylene glycol, the methanol produced in this reaction is almost completely expelled at 220° C., and after that the temperature of the product rises steadily to approximately 260° C. The carboxyphosphinic acid solution with the acid number according to the invention should in this case be added at a product temperature of 230° to 240° C.

Depending on the inherent heat capacity of the esterification or ester interchange reactor, it may be necessary to heat the carboxyphosphinic acid solution to approximately 80° to 110° C. for a continuous polyester process or to approximately 120° to 150° C. for a batch process, after the addition of the alkali metal compound and before the addition to the polyester synthesis mixture. Otherwise, the cooling of the synthesis mixture caused by the addition of the solution may impair the speed of the reaction.

After the addition of carboxyphosphinic acid, the polyester synthesis is continued in the known manner and the polyester thereby produced, after reaching the desired intrinsic viscosity, is either granulated or supplied directly to the processing units, e.g., to the spinning mill. If necessary, the granulate may be subjected to a solid phase polycondensation.

The process according to the invention produces a flame-resistant polyester that contains more DEG than non-flame-resistant polyester, but distinctly less than flame-resistant polyesters produced according to prior art processes.

The following Examples are provided for illustrative purposes only and are not intended, nor should they be construed, as limiting the invention in any manner. Those skilled in the art will appreciate that modifications and variations of the following Examples can be accomplished without violating the spirit or scope of the invention and claims set forth herein.

EXAMPLES

Production of the Carboxyphosphinic Acid Solution with the Acid Number According to the Invention In a vessel the necessary amount of ethylene glycol was heated to 80° C. while stirring, then carboxyethyl(phenyl) phosphinic acid (loose white powder) in the amount equal to a 40 weight-% solution was added to the hot glycol by means of a ball valve. The mixture was stirred at approximately 80° C. until the carboxyphosphinic acid was fully dissolved, which took 2 to 4 hours. The acid number of this solution was 412 mg KOH/g of carboxyphosphinic acid.

The solution was cooled to 35° to 40° C. and evacuated to remove oxygen. The partial vacuum was interrupted twice with nitrogen (quality: "pure"). While stirring and maintaining the nitrogen atmosphere, sodium carbonate (anhydrous) or sodium hydroxide (as approximately 40% aqueous soda lye) was added until the potentiometrically determined acid number reached the desired value. The standardized solution was stored under nitrogen until its addition to the polyester synthesis.

Example 1

Polyester Synthesis According to the Direct Esterification Method

Starting with terephthalic acid and ethylene glycol, four identical batches of 3000 kg polyester each were produced consecutively in discontinuous operation, whereby, in addition, approximately 3 m$^3$ of the esterification product of a previous batch were placed in the reactor beforehand. The esterification occurred in the presence of 380 ppm antimony triacetate (relative to PET) at approximately 260° C. and atmospheric pressure, and the subsequent polycondensation at approximately 280° C. and a pressure reduced gradually to 1 mbar.

After approximately 85% of the carboxyl groups of the terephthalic acid were esterified (determined as described above), 2.8 weight-% (2.5 mol-%) carboxyethyl(phenyl) phosphinic acid, as a 40 weight-% solution in ethylene glycol and mixed with 0.21 mol-% sodium hydroxide, corresponding to an acid number of 148 mg KOH/g of carboxyehtyl(phenyl)phosphinic acid, were added and the esterification and subsequent polycondensation were continued in a customary maimer (% relative to PET). A polyester with the following specifications was obtained (the ranges reflecting the statistical variations from one batch to another).

| | |
|---|---|
| Intrinsic viscosity | 0.60 to 0.64 dl/g |
| Phosphorus content | 0.32 to 0.34 weight-% |
| DEG content | 1.64 to 1.75 weight-% |
| Melting point | 249.1 to 250.3 °C. |

An increase of DEG content from the first batch to the last one was not observed.

Example 2

Polyester Synthesis According to the Direct Esterification Method

Using the same method as in Example 1, two identical batches of approximately 250 kg polyester each were produced consecutively, starting with 212 kg terephthalic acid and 80 L ethylene glycol for every batch. After an esterification ratio of 85% was reached, 6.9 kg (2.5 mol-%, relative to PET) carboxyethyl(phenyl)phosphinic acid, as a 40 weight-% solution in ethylene glycol and standardized to an acid number of 308 KOH/g with 289 g $NA_2CO_3$ (0.21 mol-%, relative to PET), were added to each batch. The polyester obtained had the following properties:

| | |
|---|---|
| Intrinsic viscosity | 0.64 to 0.65 dl/g |
| Phosphorus content | 0.38 weight-% |
| DEG content | 2.1 weight-% |
| Melting point | 247 °C. |

Example 3

Comparative Example

Using the same method as in Example 1, three identical batches of approximately 1.5 kg each were produced consecutively, whereby, in addition, approximately 0.8 kg of the esterification product of a previous batch were placed in the reactor beforehand for each batch. After an esterification degree of 90% was reached, 2.8 weight-% of carboxyethyl (phenyl)phosphinic acid, as a 50 weight-% solution in ethylene glycol, without the addition of alkali metal compound, were added to each batch. A polyester was produced with an intrinsic viscosity of 0.63 dl/g and a DEG content of 1.8 weight-% in the $1^{st}$ batch, 2.4 weight-% in the $2^{nd}$ batch, and 2.7 weight-% in the $3^{rd}$ batch.

Example 4

Polyester Synthesis According to the Ester Interchange Method 1530 g of dimethyl terephthalate and 749 g of ethylene glycol were ester interchanged within 160 minutes at a temperature rising from 155° to 260° C. and normal pressure in the presence of 410 mg Mn $(OOC.CH_3)_2.4\ H_2O$ as catalyst. 20 minutes before the end of the ester interchange, 43 g of carboxyethyl(phenyl)phosphinic acid were added as a 40 weight-% solution in ethylene glycol and mixed with 0.21 mol-% sodium hydroxide as in Example 1 (corresponding to an acid number of 125 mg KOH/g) and the ester interchange continued. Thereafter, 405 mg of antimony glycolate in 20 ml ethylene glycol were added as a polycondensation catalyst, and the ester interchange catalyst was inactivated with 182 mg $H_3PO_3$ in a small amount of ethylene glycol and the reaction mixture polycondensed at 280° C. with pressure dropping gradually to 0.8 to 1.2 mbar.

Three identical batches were produced subsequently, the reactor being emptied completely after each batch.

A polyester with the following specifications was obtained, the ranges reflecting the statistical variations from one batch to another.

| | |
|---|---|
| Intrinsic viscosity | 0.63 to 0.65 dl/g |
| Phosphorus content | 0.36 to 0.38 weight-% |
| DEG content | 1.0 to 1.3 weight-% |
| Melting point | 249 to 251 °C. |

Example 5

Polyester Synthesis According to the Ester Interchange Method

Example 4 was repeated (3 batches), but a carboxyethyl (phenyl)phosphinic acid solution was added, which, similar to Example 2, was mixed with 0.21 mol-% $NA_2CO_3$, corresponding to an acid number of 315 mg KOH/g. A polyester with an intrinsic viscosity of 0.64 dl/g and a DEG content of 1.3 to 1.5 dl/g was obtained.

Example 6

Comparative Example

Example 4 was repeated with one batch, whereby instead of a carboxyethyl(phenyl)phosphinic acid solution with a standardized acid number the same amount of carboxyethyl (phenyl)phosphinic acid was added as a 50 weight-% solution in ethylene glycol. A polyester with an intrinsic viscosity of 0.66 dl/g and a DEG content of 2.0 weight -% was obtained.

The intrinsic viscosities were measured at 25° C. with a solution of 500 mg of polyester in 100 ml of a mixture of phenol and 1,2-dichlorobenzene (weight ratio 3:2).

The phosphorus content was determined spectrophotometrically by means of the molybdenum blue reaction. Prior to that, the sample was hydrolyzed and incinerated, whereby the phosphorus was converted to orthophosphate.

The diethylene glycol (DEG) produced during the polyester synthesis was determined by gas chromatography in an ester interchange mixture of 1 g polyester with 30 ml methanol and 50 mg/l zinc acetate, said mixture obtained at 200° C. in a bomb tube.

The melting point of the polyester was determined by DSC (differential scanning calorimetry) measurement at a heating rate of 10° C./min.

I claim:

1. A process for the production of flame-resistant polyesters comprising esterification or ester interchange and co-polycondensation of a reaction mixture of at least one diol and at least one dicarboxylic acid or its dialkyl ester with at least one carboxyphosphinic acid of the formula HOOC—R—P(O)(OH)R', wherein R and R' are independently $C_{1-10}$-alkyl or $C_{6-10}$-aryl, wherein a) the carboxyphosphinic acid, before being added to said reaction mixture, is dissolved in ethylene glycol of not more than 90° C. to form a solution, b) the acid number of said solution is standardized to 50 to 350 mg KOH/g of carboxyphosphinic acid by adding at least one basic alkali metal compound to said solution in the absence of oxygen, and c) said solution with a standardized acid number is added to said reaction mixture during the second half of the esterification or ester interchange reaction.

2. The process according to claim 1, wherein the alkali metal compound is selected from the group consisting of sodium hydroxide, potassium hydroxide, sodium carbonate, potassium carbonate, sodium acetate, potassium acetate, and combinations thereof.

3. The process according to claim 1, wherein the acid number is standardized to a value in the range of from 100 to 200 mg KOH/g of carboxyphosphinic acid.

4. The process according to claim 1, wherein said carboxyphosphinic acid solution with a standardized acid number is added to said reaction mixture when approximately 80 to 90% of the carboxyl groups of the dicarboxylic acid or acids are esterified with diol.

5. The process according to claim 1, wherein the carboxyphosphinic acid is carboxyethyl(phenyl)phosphinic acid.

6. The process according to claim 1, wherein the diol comprises at least 50 mol-% ethylene glycol, and optionally 1,3-propane diol, 1,4-butane diol, 1,4-cyclohexane methanol, or mixtures thereof, and the dicarboxylic acid consists of terephthalic acid or 2,6-naphtalene dicarboxylic acid, or mixtures thereof, and optionally isophthalic acid, 4-cyclohexane dicarboxylic acid, or mixtures thereof.

* * * * *